United States Patent [19]
DiTullio

[11] Patent Number: 5,419,838
[45] Date of Patent: May 30, 1995

[54] GROUNDWATER STORAGE AND DISTRIBUTION SYSTEM HAVING A GALLERY WITH A FILTERING MEANS

[75] Inventor: Robert J. DiTullio, Brookfield, Conn.

[73] Assignee: Cultec, Inc., Brookfield, Conn.

[21] Appl. No.: 236,409

[22] Filed: May 2, 1994

[51] Int. Cl.⁶ .............................................. B01D 35/02
[52] U.S. Cl. .................................. 210/747; 210/791; 210/155; 210/162; 210/170; 210/236; 210/451
[58] Field of Search .............. 210/747, 791, 154, 155, 210/162, 170, 232, 236, 335, 339, 489, 446, 451, 496, 499, 209, 220

[56] References Cited

U.S. PATENT DOCUMENTS

| | | | |
|---|---|---|---|
| 1,349,734 | 8/1920 | Riley | 210/155 |
| 1,889,325 | 11/1932 | Whaley | 210/335 |
| 2,996,189 | 8/1961 | Salterbach | 210/155 |
| 3,282,430 | 11/1966 | Kinne | 210/170 |
| 4,319,998 | 3/1982 | Anderson | 210/170 |
| 4,689,145 | 8/1987 | Mathews et al. | 210/170 |
| 4,759,661 | 7/1988 | Nichols et al. | 405/43 |
| 4,919,568 | 4/1990 | Hurley | 210/170 |
| 5,087,151 | 2/1992 | DiTullio | 405/43 |
| 5,129,757 | 7/1992 | Johnson | 405/43 |

*Primary Examiner*—Christopher Upton
*Attorney, Agent, or Firm*—Ware, Fressola, Van Der Sluys & Adolphson

[57] ABSTRACT

A system for filtering, storing, and distributing groundwater, which includes a gallery having an elongated main body portion with an arch-shaped configuration with an enlarged inner chamber, having end walls covering each end thereof with an inlet opening for receiving the liquid to the enlarged inner enclosure, having side walls with laterally extending outer ribs and inner corrugations within the elongated body portion. The system also includes a collapsible filter having a hinged frame with a filtering material and a side portion for sliding into the inner corrugations of the gallery.

22 Claims, 7 Drawing Sheets

GROUNDWATER STORAGE AND DISTRIBUTION SYSTEM HAVING A GALLERY WITH A FILTERING MEANS

FIELD OF THE INVENTION

The present invention relates generally to a system for storing groundwater, and relates more particularly to a system for filtering the groundwater for later use when needed.

RELATED PRIOR ART

Groundwater from rainstorms is a problem plaguing cities and suburbs alike and there is a need for systems which effectively filter, store and distribute it for later use when needed. To minimize flooding and erosion caused by stormwater run-off from paved or improved acreage, many new building projects include high volume underground water storage systems having as many as 350 to 5,000 of a lightweight plastic gallery shown in U.S. Pat. No. 5,087,151, arrayed to store the run-off.

Mathews et al (U.S. Pat. No. 4,689,145) teaches a known system which filter groundwater by using successively arrayed in-feed filters for removing particulate matter from the groundwater in order to overcome the underground storage silting problem. The filtered water then goes to a vertical shaft dry well for storage. However, one disadvantage of the Mathews et al system is that it uses a costly concrete catch basin and polypropylene bags laced around PVC pipe frames to form removable filters.

Other known systems are described in Hurley (U.S. Pat. No. 4,919,568) and Johnson (U.S. Pat. No. 5,129,757), which both describe systems for the filtration of particles or of silt from ground water in catch basins. Hurley uses geo-textile fabric screens lining the catch basin walls to pass air from the soil to the atmosphere and to pass water into the soil, but no arrayed succession of removable filters is shown. Johnson shows a curtain drain with narrow intake slots 12, 13, or 14, connected to a suction pump.

Whaley (U.S. Pat. No. 1,889,325) describes a multiscreen filter for an oil burner fuel line, similar to the filter in Mathews et al. Nichols et al (U.S. Pat. No. 4,759,661) describes a leaching system conduit.

SUMMARY OF THE INVENTION

The invention features apparatus for storing and filtering liquid in a drain field, including a gallery having an elongated main body portion with an arched shape with an enlarged inner chamber, having at least one end wall covering one end thereof with an inlet opening for receiving the liquid to the enlarged inner chamber, having at least one side wall with outer laterally extending ribs forming inner corrugations on the within the elongated body portion; and at least one filtering means having a frame enclosing a filtering material, said frame having a side portion for sliding into the inner corrugations of the gallery.

In one embodiment, the gallery has an arched shape and has a top opening with a removable cover, and the filter has a corresponding arched shape and is collapsible for inserting it into and removing it from the gallery.

Accordingly, a principal object of the present invention is to provide a gallery with rigid filter frames arranged in the inner corrugations with a felted polypropylene filter batts stretched across the frame.

A principal advantage of the present invention is to provide an economical and convenience way of cleaning the filter by removing the cover to open the enlarged inner chamber and either simply backflushing the filter material inside the gallery, or easily removing the filters and cleaning them outside the gallery.

None of the known patents discussed above suggests a gallery having such an economical and convenient filtering means.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

A DESCRIPTION OF THE DRAWING

For a fuller understanding of the nature and objects of the invention, reference should be made to the following detailed description taken in connection with the accompanying drawings, not in scale, in which:

FIGS. 1(a) and 1(b) are perspective views of one embodiment of a gallery of the present invention;

FIGS. 2(a), 2(b), 2(c) are a sketch of another embodiment of a gallery of the present invention, including top down, side and front views;

FIGS. 3(a) and 3(b) are a perspective view of still another alternative embodiment of a gallery of the present invention;

FIG. 4 is a cross-sectional side diagrammatic view of the gallery shown in FIG. 1 having a filtering means arranged therein.

FIGS. 5(a), (b) and (c) are diagrammatic views of the filtering means shown in FIG. 4;

Figure 9:
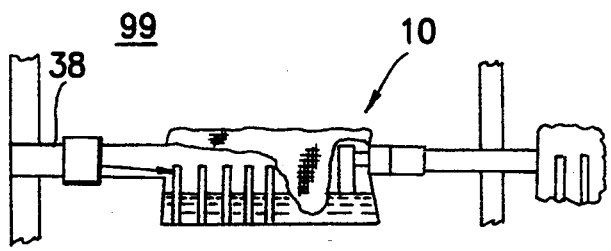
Figure 10:
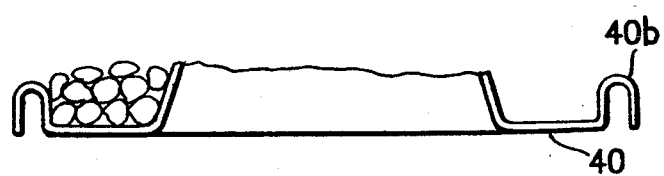
Figure 8A:
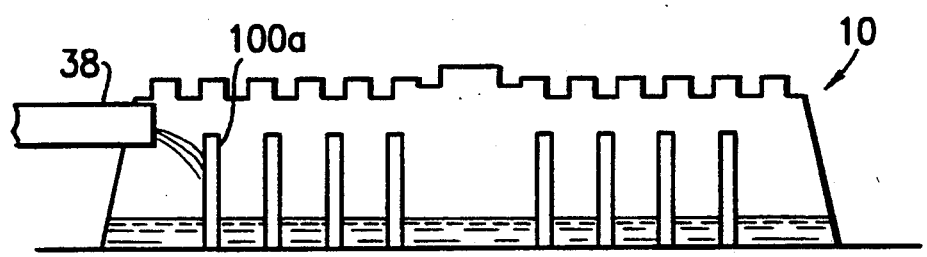
Figure 8B:
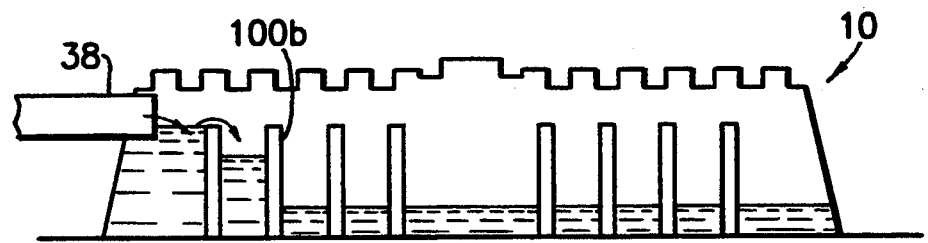
Figure 8C:
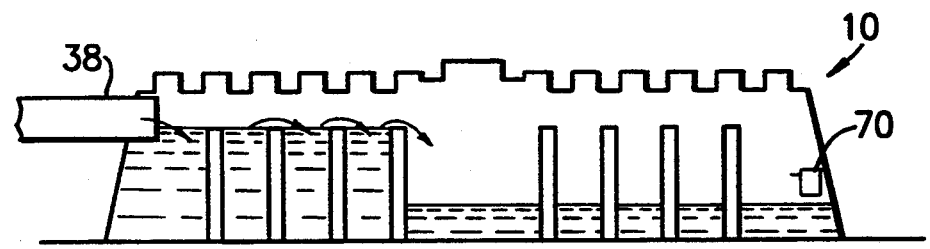
Figure 8D:
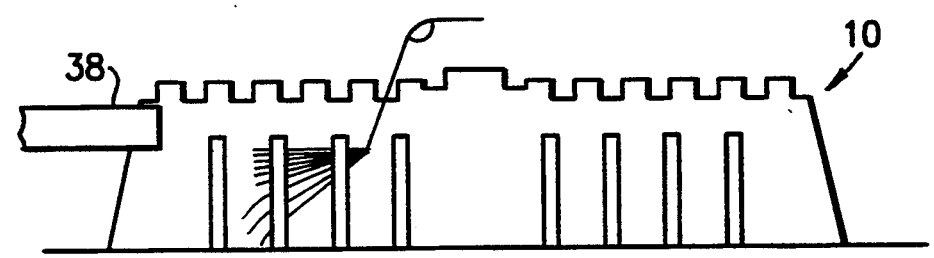

FIG. 8(a), (b), (c) and (d) is a series of side views showing a gallery like the one shown in FIG. 1 with a plurality of filtering means arranged therein in use;

FIG. 9 is a side diagrammatic view of a two adjacent gallery like the one shown in FIG. 1; and FIG. 10 is a side diagrammatic view of a gallery like the one shown in FIG. 1.

Figure 11A:
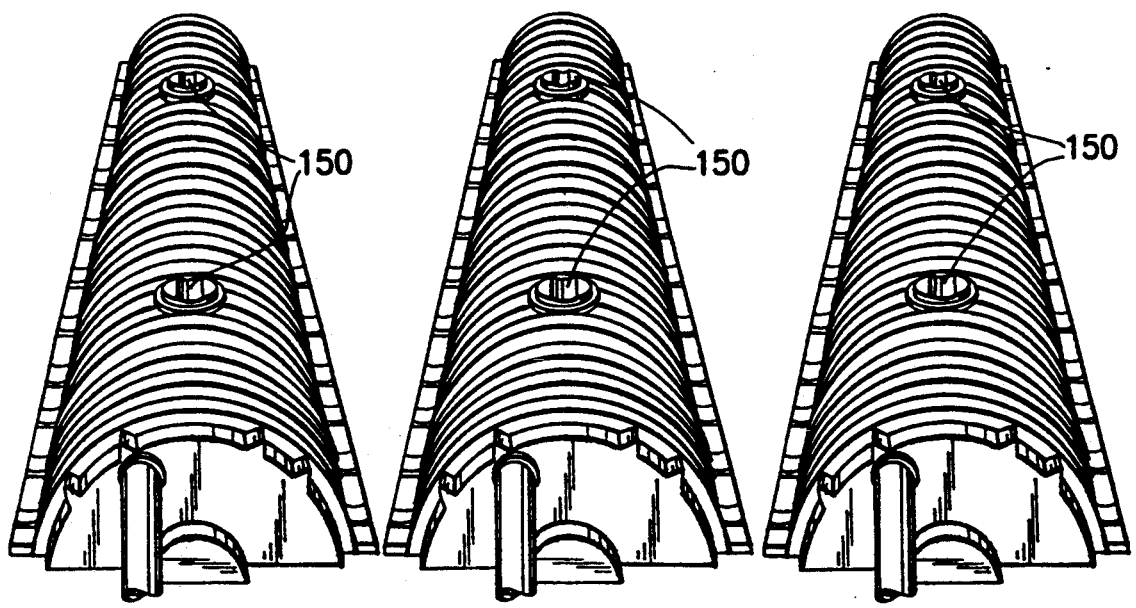
Figure 11B:
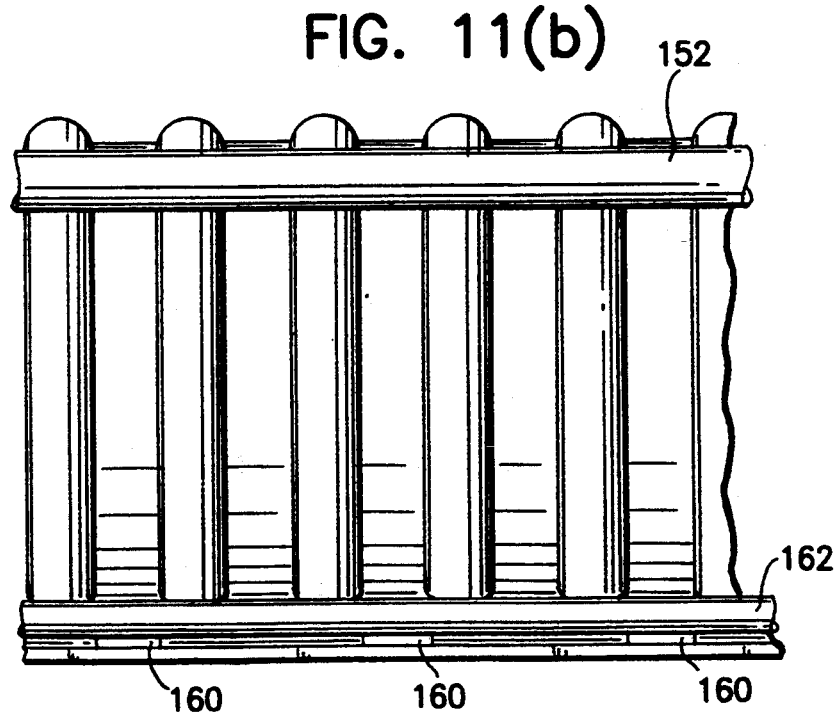

FIGS. 11a and 11b are perspective views of an alternative embodiment of a gallery.

BEST MODE FOR CARRYING OUT THE INVENTION

Figure 1A:
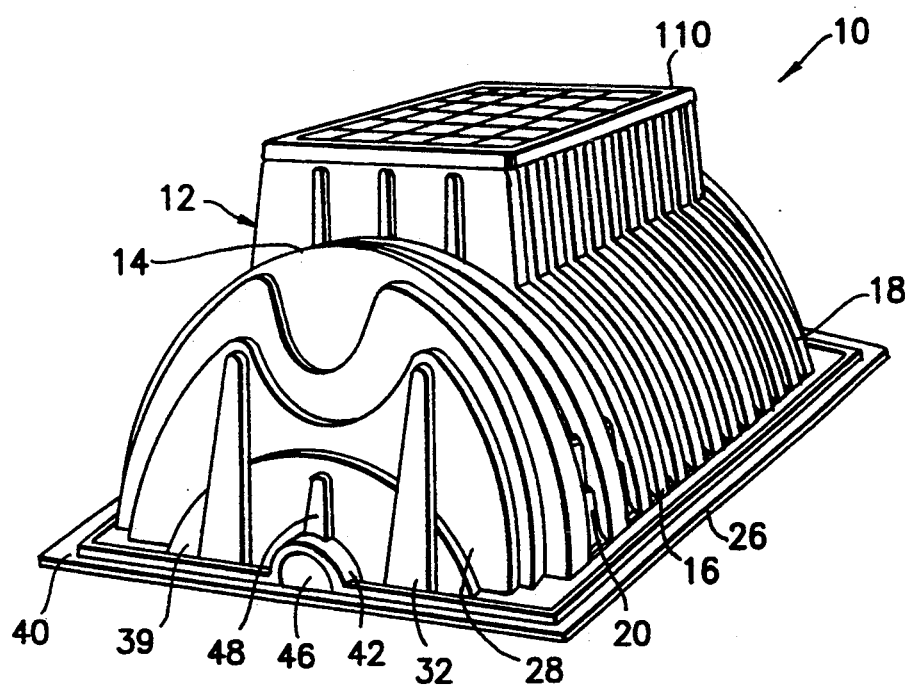
Figure 1B:
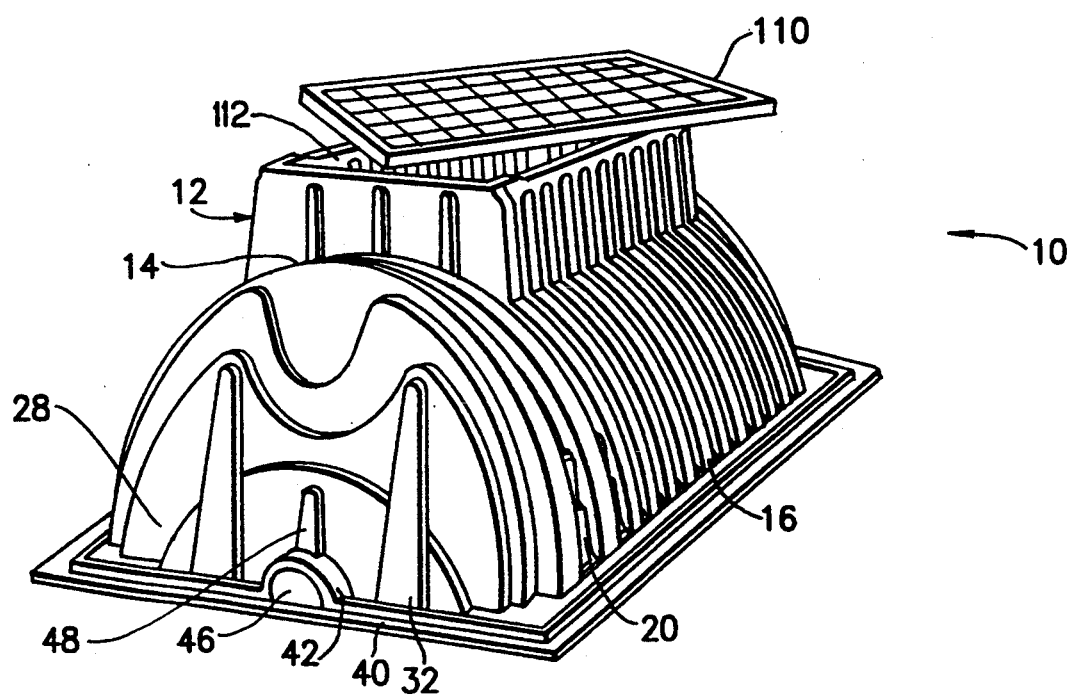
Figure 2A:
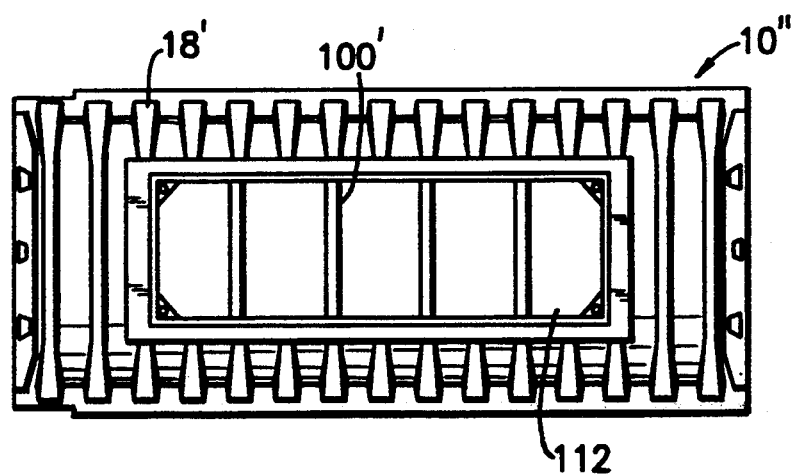
Figure 2B:
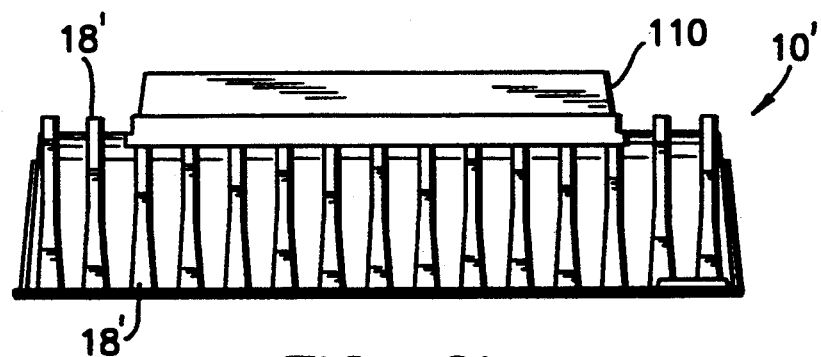
Figure 2C:
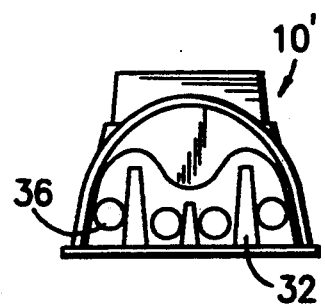

FIGS. 1-3 show three different galleries generally indicated as 10, 10' and 10". These galleries are similar in many respects to one shown in FIG. 1 of U.S. Pat. No. 5,087,151. The references numeral used herein to describe the galleries in FIGS. 1-3 substantially correspond to the reference numerals used to describe the gallery in U.S. Pat. No. 5,087,151, subject to the addition of an additional single or double apostrophe. The subject matter of U.S. Pat. No. 5,087,151 is hereby incorporated by reference.

Figure 3A:
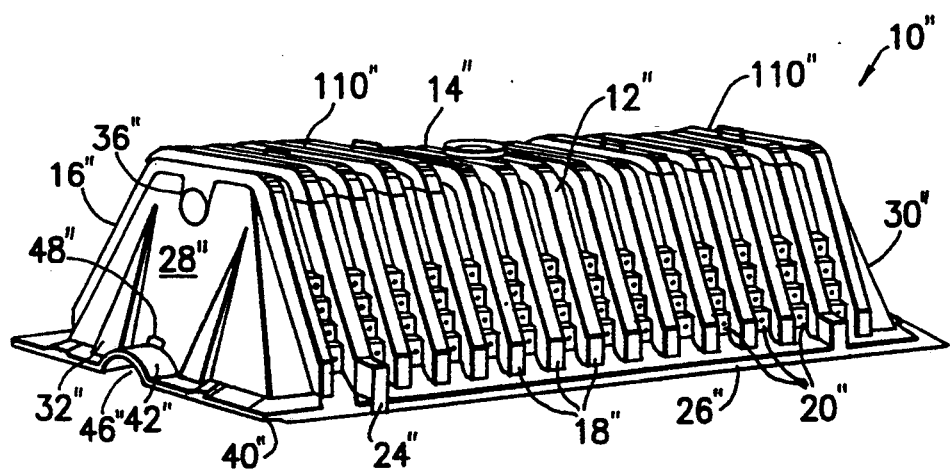

As shown in FIGS. 1-3, the galleries 10, 10' and 10" are used for the storage and distribution of groundwater. In FIGS. 1(a) and (b), the gallery 10 forms an enclosure and has an arched or domed shape. The arched shape allows for molding draft and nesting type stacking and provides structural integrity to the gallery. The gallery in FIGS. 3(a) and 3 (b) are a trapezoidal shape The galleries 10, 10' 10" can have either an open bottom or a closed bottom depending on the application.

In FIG. 1(a) and (b), the gallery 10 is formed by a main body portion 12 having a top domed wall 14 and two downwardly inclined sidewalls 16. The main body portion 12 has a corrugated configuration with upstanding, laterally extending outer ribs 18 spaced longitudinally therealong and inner corrugations (not labelled) with the elongated body portion.

Figure 3B:
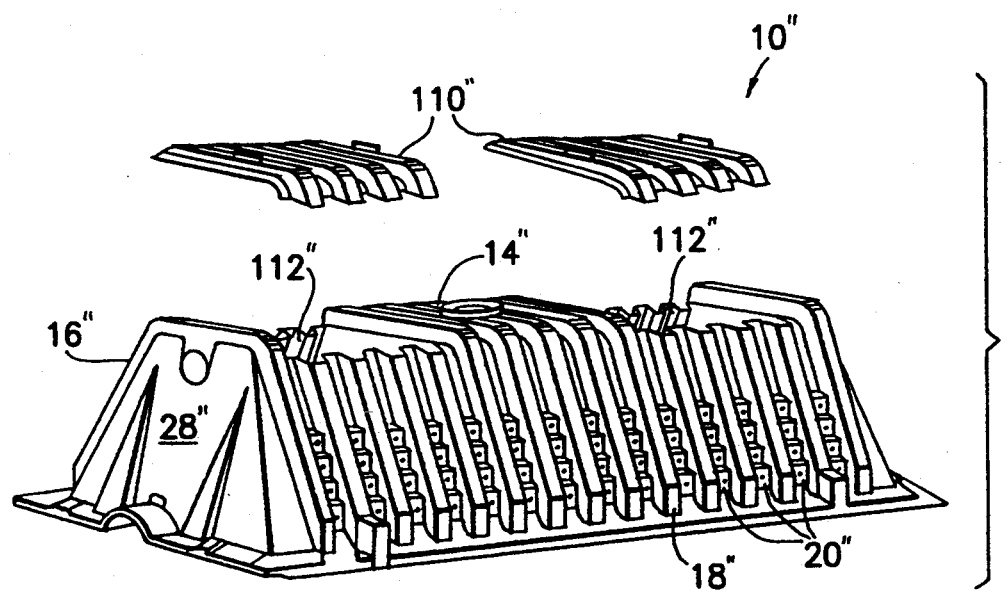

Formed on the sidewalls 16, in between adjacent ribs 18, are a plurality of vertical infiltration walls 20. The sidewalls 16 of the main body portion 12 terminate at base portions 26 extending longitudinally along the lower portion thereof. In FIGS. 3(a) and (b), the gallery 10" has sidewalls 16" which also include nesting lugs 24" to allow the gallery 10" to be nested with other similar galleries without firmly locking thereto and facilitating separation thereof. In FIG. 1(a) and (b), the base portions 26 are designed to support the gallery 10 on the ground. Inclined end walls 28, 30 are located on the ends of the main body portion 12 of the gallery 10. Each end wall 28, 30 has vertically extending structurally raised struts 32 thereon. The struts 32 provide structural support for the end walls 28, 30 to increase their load carrying capacity. As shown in FIG. 2(a) the end walls 28' and 30' also each include openings 36'. As shown in FIG. 3(b) the end walls 28" and 30" also each include an opening 36". The openings 36' and 36" are for a perforated, polyvinylchloride drainpipe 38, for example, as shown in FIG. 8 which extends therein through the entire interior of the gallery 10. The flange 40 extends outwardly from the end wall 28 and includes an upstanding protuberance 39 dimensionally sized to mate with associated protuberances on an adjoining gallery (not shown). The protuberance 39 includes an enlarged centrally located locking lug 42. The centrally located locking lug 42 at least partially surrounds an aperture 46 in the end wall 28. The aperture 46 permits movement of groundwater between adjoining galleries when the galleries are joined together to form a drain field (See FIG. 8). The centrally located locking lug 42 has a gusset 48 providing structural integrity thereto. Most of these features of the gallery are described in detail in U.S. Pat. No. 5,087,151.

The gallery 10 also has a bottom opening, which is best shown by way of example in FIG. 10, for accessing an enlarged inner enclosure best shown in FIG. 8 of the gallery 10 to remove and clean a filter generally indicated as 100 arranged therein. In addition, the gallery 10 has a top opening and removable covers 110 for accessing the enlarged inner enclosure of the gallery 10 to remove and clean and the filter 100 (see FIGS. 4–7). As discussed below, the filter 100 is collapsible for folding up and passing though the opening 112 (FIG. 1(b)) in the gallery 10, which is large enough for a man to fit through. Alternatively, since the filter 100 is collapsible, and accessed through the opening 112, the gallery 10 may have a closed bottom (not shown) as well.

As shown in FIGS. 4–7, the filtering means is generally indicated as 100 and is collapsible for installing it into the gallery 10 and for removing it from the gallery 10. As shown in FIG. 5(a), the filtering means 100 has a frame 102 with four sides 102a, 102b, 102c, and 102d which are respectively hinged together by four pins 106, also shown in FIG. 5(b). In addition, sides 102a and 102c have an intermediate hinge with pins 108. FIG. 5(c) shows a PVC pipe 109 with a 90 degree cut arranged over the side 102a and turned 90 degrees to prevent side 102a from bending.

The filtering material 104 may include a felted material, such as a polypropylene felted fabric, although other suitable filtering material could be used without deviating from the spirit of the invention. A plurality of filters is normally used with graduating filtering grades, such as from course, medium to fine. In one embodiment a mesh filter as a course filter, a thick polypropylene material is used as a medium filter is chosen, and a thin polypropylene material is used as a fine filter.

The frame 102 of the filtering means 100 also enhances the overall strength and the structural integrity of the gallery 10.

Figure 6:
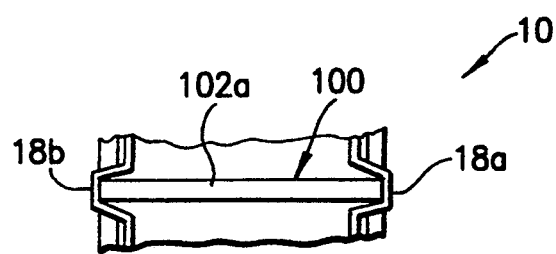
FIG. 6 is a partial, top view of the filtering means shown in FIG. 4.

FIG. 6 best shows how the filter 100 is arranged in the inner corrugations 18a and 18b of the side wall 16 of gallery 10.

Figure 4:
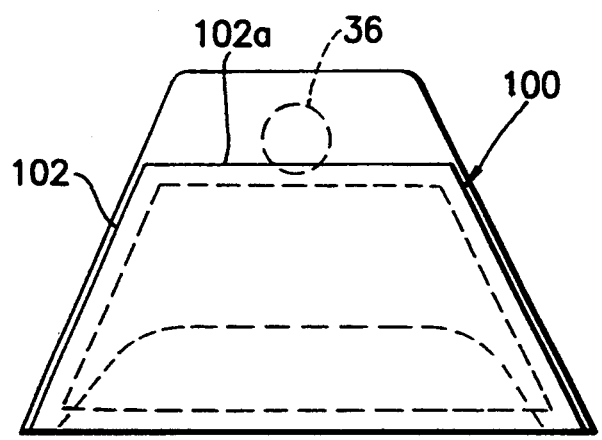
Figure 5A:
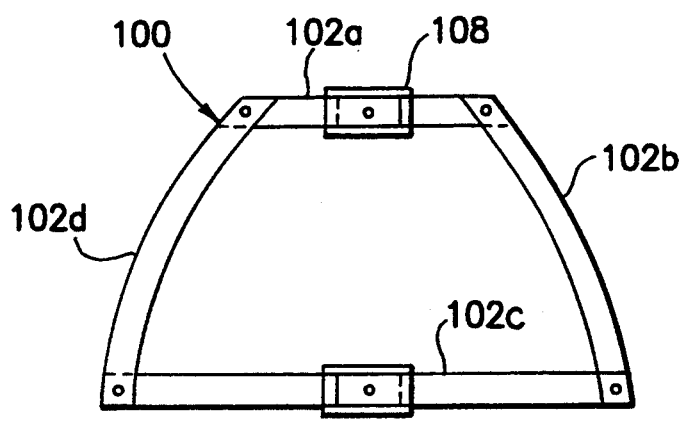
Figure 5B:
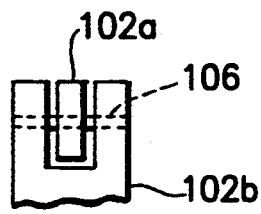
Figure 5C:
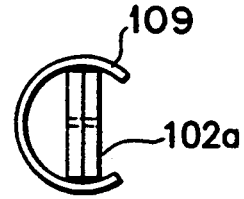
Figure 7:
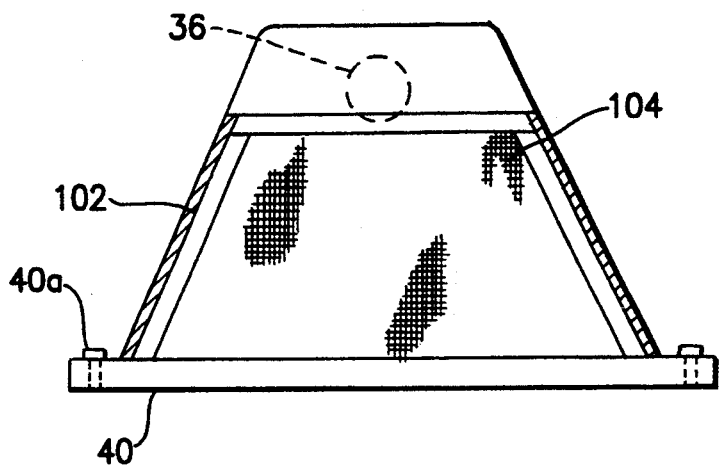
FIG. 7 is a cross-sectional diagrammatic side view of the gallery shown in FIG. 1 having a filtering means arranged therein.

As shown in FIGS. 4 and 7, the elongated main body portion and the filtering means are both trapezoidally shaped.

FIG. 8 shows the gallery 10 and filter 100 in operation. For example, FIG. 8(a) shows storm water flowing into a gallery 10. The storm water contains some silt and sand which enters the filter and is filtered by the first filtering unit 100a. FIG. 8(b) shows that as the first filter 100a becomes partially blocked in the filtration process the stormwater will rise above the first filter 100a and will be filtered by the second filter 100b. FIG. 8(c) shows the filtration process after the first four filters are partially blocked. FIG. 8(d) shows a pressure gun used to spray the filters to clean them. The filters may either be removed from the gallery through the opening 112, as discussed below, or cleaned while in the gallery by backwashing.

In one embodiment, the gallery also includes a float device 70 for monitoring the height of the water within the gallery 10, as shown in FIG. 6. The float device 70 provides an indication that the water level is high in the gallery so the filters can be changed or cleaned.

In other embodiments shown in FIGS. 7 and 10, the flange 40 has an opening in at least one corner for receiving a set screw 40a for securing gallery 10 to another surface (not shown). As shown in FIG. 9, the flange 40 has a ribbed outer rim 40b for retaining crushed stone piled thereon for anchoring said gallery in place.

FIG. 9 shows a gallery a service chamber 99 connected to an adjacent gallery 10A. The infeed pipe 38 provides water to the gallery 10, where it is stored and filtered, and passed along to the adjacent gallery 10A. The gallery 10 is connected and disconnected to the system by coupling means 90.

FIGS. 11a and 11b show an alternative embodiment of a gallery in which the gallery has a top pipe recession 150 and a side pipe recession 160. The top pipe recession 150 holds an effluent pipe 152 in place on the topside of the gallery. The side pipe recession 160 holds an aeration tube 162 in place on the side of the gallery. The top recession 150 and side recession 160 hold their respective pipes in place when the gallery are covered with top fill.

In an alternative embodiment, the gallery has can be used as a junction for electrical, telephone, CATV or optical fiber slice for storing as much as 160' feet of extra wire or cable. In such a case, the wire or cable is provided to and from the end walls, and the wire or cable is stored inside the gallery. The extra wire or cable is needed so the workmen can work carry on the splice to their truck to work on if necessary and return it after the work is finished. The filter frames can be used for support for a drop over tray to form a table for the electrical, telephone, CATV or optical fiber to elevate the wire or cable.

In another alternative embodiment, the gallery has applications as a catch basin with the top cover being replaced by a grate.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. Apparatus for storing and filtering liquid in a drain field, comprising:
    a gallery having an elongated main body portion forming an arch-shaped configuration with an enlarged inner enclosure, having at least one end wall covering one end thereof with an inlet opening for receiving the liquid to the enlarged inner enclosure, having side walls with outer laterally extending ribs and inner corrugations within said elongated body portion; and
    at least one filtering means having a frame enclosing a filtering material, said frame having a side for sliding into the inner corrugations of said gallery.

2. Apparatus according to claim 1, wherein said gallery has a top opening and a removable cover for accessing the enlarged inner chamber of said gallery to remove and clean and said filtering means.

3. Apparatus according to claim 1, wherein said filtering means is collapsible for inserting it into and removing it out of said gallery, and includes four sides each hingeably coupled together at their respective ends, and a top and bottom side of the four sides each has an intermediate hinge for folding inwardly and collapsing the filtering means to remove and clean it.

4. Apparatus according to claim 3, wherein said filtering means includes a lock for each intermediate hinge on the top and bottom sides.

5. Apparatus according to claim 4, wherein said lock is a PVC pipe with a 90 degree cut for fitting over and surrounding the hinge and said PVC pipe, when is turned 90 degrees, forms means to prevent said hinge from bending.

6. Apparatus according to claim 1, wherein the filtering material is a felted material, including a polypropylene felted fabric.

7. Apparatus according to claim 1, wherein said gallery has a bottom opening for accessing the enlarged inner enclosure of said gallery to remove and clean said filtering means.

8. Apparatus according to claim 1, wherein said gallery has a flange around its base for receiving gravel to secure the gallery.

9. Apparatus according to claim 8, wherein the flange has an opening at least one corner for receiving a set screw for securing gallery to another surface.

10. Apparatus according to claim 8, wherein the flange has a ribbed outer rim for retaining crushed stone piled thereon for anchoring said gallery in place.

11. Apparatus according to claim 1, wherein said elongated main body portion has a trapezoidal shape and the frame of the filtering means has a corresponding trapezoidal shape.

12. Apparatus according to claim 1, wherein the apparatus includes a plurality of filters with graduating filtering grades, from coarse, medium to fine, and the filter material includes a mesh filter as the coarse filter, a thick polypropylene material as the medium filter, and a thin polypropylene material as the fine filter.

13. Apparatus according to claim 1, wherein the gallery has a top pipe recession for holding an effluent pipe in place on the topside of the gallery when the gallery is covered with top fill.

14. Apparatus according to claim 1, wherein the gallery has a side pipe recession for holding an aeration tube in place on the side of the gallery when the gallery is covered with top fill.

15. Apparatus for storing and filtering liquid in a drain field, comprising:
    a gallery having an elongated main body portion forming an arch-shaped configuration with an enlarged inner enclosure, having end walls covering its ends thereof with an inlet opening for receiving and providing the liquid to and from the enlarged inner enclosure, having side walls with laterally extending ribs that have inner rib receiver on the inside of said side walls; and
    a plurality filtering means, each having a frame enclosing a filtering material, said frame having a side for sliding into the inner rib receiver of said side wall of said gallery.

16. Apparatus according to claim 15, wherein said gallery has a removable top for accessing the enlarged inner enclosure of said gallery to remove and clean and said filtering means.

17. Apparatus according to claim 15, wherein said filtering means is collapsible for inserting it into and removing it out of said gallery, and includes four sides each hingeably coupled together at their respective ends, and a top and bottom side of the four sides each has an intermediate hinge for folding inwardly and collapsing the filtering means to remove and clean it.

18. Apparatus according to claim 15, wherein said filtering means includes a lock for preventing intermediate hinges on top and bottom sides of the filtering means from bending.

19. Apparatus according to claim 18, wherein said lock is a PVC pipe with a 90 degree cut for fitting over and surrounding the hinge and said PVC pipe, when turned 90 degrees, forms means to prevent said hinge from bending.

20. Apparatus according to claim 19, wherein said gallery has a bottom opening for accessing the enlarged inner enclosure of said gallery to remove and clean said filtering means.

21. Apparatus according to claim 20, wherein the filtering material is a felted material, including a polypropylene felted fabric.

22. A method for cleaning a filtering means arranged in a gallery, the gallery having an elongated main body portion with an arch-shaped configuration forming an enlarged inner enclosure, having end walls covering its ends with an inlet opening for receiving the liquid to the enlarged inner enclosure, having side walls each with laterally extending rib members that have inner rib receivers on the inside of said elongated body portion; and the filtering means having a frame enclosing a filtering material, said frame having a side for sliding into a pair of opposing inner rib receivers of said at least one side wall of said gallery, comprising the steps of:
  removing a removable top of the gallery;
  folding the filtering means to collapse it;
  removing the filtering means from the gallery;
  cleaning the filtering means;
  reinserting the filtering means into said gallery; and
  unfolding the filtering means and arranging it in place in the gallery.

* * * * *

UNITED STATES PATENT AND TRADEMARK OFFICE
CERTIFICATE OF CORRECTION

PATENT NO. : 5,419,838
DATED : May 30, 1995
INVENTOR(S) : R. DiTullio

It is certified that error appears in the above-indentified patent and that said Letters Patent is hereby corrected as shown below:

At column 3, line 4, please insert a comma between "10'" and "10''".

At column 5, line 28 (claim 1, line 4), please change "forming an arch-shaped configuration with" to --with an arch-shaped configuration forming--.

Signed and Sealed this

Twenty-second Day of August, 1995

Attest:

BRUCE LEHMAN

*Attesting Officer*  *Commissioner of Patents and Trademarks*